United States Patent
Bass et al.

(10) Patent No.: US 8,244,911 B2
(45) Date of Patent: Aug. 14, 2012

(54) METHOD AND APPARATUS FOR CONCURRENT AND STATEFUL DECOMPRESSION OF MULTIPLE COMPRESSED DATA STREAMS

(75) Inventors: Brian Mitchell Bass, Apex, NC (US); Giora Biran, Zichron-Yaakov (IL); Hubertus Franke, Cortlandt Manor, NY (US); Hao Yu, Valhalla, NY (US)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 12/177,440

(22) Filed: Jul. 22, 2008

(65) Prior Publication Data
US 2010/0020825 A1    Jan. 28, 2010

(51) Int. Cl.
*G06F 15/16* (2006.01)
*H04J 3/18* (2006.01)
(52) U.S. Cl. .................. 709/247; 370/474; 370/476
(58) Field of Classification Search .............. 370/392, 370/401, 474, 476; 341/51; 382/233; 709/231, 709/247
See application file for complete search history.

(56) References Cited

U.S. PATENT DOCUMENTS

| | | | | |
|---|---|---|---|---|
| 5,583,500 A * | 12/1996 | Allen et al. | ...... | 341/107 |
| 7,079,057 B2 * | 7/2006 | Kim et al. | ...... | 341/107 |
| 7,307,552 B2 * | 12/2007 | Ma et al. | ...... | 341/51 |
| 2002/0078241 A1 * | 6/2002 | Vidal et al. | ...... | 709/247 |
| 2003/0028673 A1 * | 2/2003 | Lin et al. | ...... | 709/247 |
| 2003/0058873 A1 * | 3/2003 | Geiger et al. | ...... | 370/401 |
| 2005/0104753 A1 * | 5/2005 | Dror et al. | ...... | 341/51 |
| 2007/0280543 A1 * | 12/2007 | Matsuhira | ...... | 382/233 |
| 2008/0059648 A1 * | 3/2008 | Manges | ...... | 709/231 |

* cited by examiner

*Primary Examiner* — Andrew Chriss
*Assistant Examiner* — Awet Haile
(74) *Attorney, Agent, or Firm* — F. Chau & Associates, LLC; Brian P. Verminski, Esq.

(57) ABSTRACT

A method for decompressing multiple data streams includes receiving a packet of data of a compressed data stream, directing the received packet to a selected one of a plurality of decompression functional units within a hardware-based decompression accelerator unit, obtaining decompression state information pertaining to the compressed data stream, and decompressing the received packet using the obtained decompression state information.

16 Claims, 5 Drawing Sheets

METHOD AND APPARATUS FOR CONCURRENT AND STATEFUL DECOMPRESSION OF MULTIPLE COMPRESSED DATA STREAMS

BACKGROUND OF THE INVENTION

1. Technical Field

The present disclosure relates to decompression of data streams and, more specifically, to a method and apparatus for concurrent and stateful decompression of multiple compressed data streams.

2. Discussion of Related Art

Network security is a critical aspect of information technology. Malicious attacks such as distributed denial of service attacks may bring down even the largest of network servers. Other forms of intrusion may compromise the security of sensitive data. As modern enterprises are heavily reliant upon network service and sensitive data, even relatively minor attacks could lead to millions of dollars in damages or lost sales. More severe attacks could disrupt the critical function of an enterprise and cause immeasurable damage.

Packet inspection systems and other security measures have been developed to protect against malicious attack and other network risks. Many of these systems stand between the protected servers and the greater network and inspect incoming data packets. Packets deemed safe are allowed to proceed while suspicious packets are blocked. When used in connection with large network servers, packet inspection systems must be able to process large amounts of data quickly enough to avoid hindering communication with the protected servers.

Traditionally, these packet inspection systems were based on general-purpose central processing units (CPUs) that executed software for providing the necessary protective measures. However, to meet the demands of modern network traffic, hardware accelerators have been used to offload many processing steps that were traditionally handled by the CPU.

Network traffic consists of data streams that embody compressed data or content that is divided into a plurality of packets. Because network traffic is compressed, packet inspection devices may decompress the data streams prior to analysis. Various methods for compression and decompression are well known in the art. One popular algorithm for compression is the "Deflate" algorithm. The complementary decompression algorithm is the "Inflate" algorithm. These algorithms are based on a derivative of the Lempel-Ziv 1977 (aka LZ77) algorithm.

Compression algorithms generally transform an input data stream into a set of tokens known as "literals" and "references." Literals are the data itself, while references refer to a previously encountered string in the input. Literals and reference tokens can be further compressed by optionally encoding them, for instance through static or dynamic Huffman encoding schemes. To remain efficient, references distances may be limited so that the entire data stream does not need to be retained to make sense of the reference tokens. This distance may be, for example, 32 Kbytes. Hence the compressed stream includes the token stream and the optional associated dynamic Huffman table(s).

Decompression works in reverse by taking a compressed input stream, extracting the variable length tokens, optionally decoding them through the lookup table (e.g. Huffman table) and presenting the decoded data to a copy engine that either copies the literal from the token or copies the data reference from the recent history of the output buffer. Increasingly these algorithms are implemented in hardware accelerator engines and are being integrated onto chip cores. Dependent on the available chip area, often only a few engines can be accommodated.

Common to these systems is that an engine needs to be dedicated to a particular data stream and process the stream in its entirety before the engine can be used to process a different stream. Hence conventional approaches are suited for situations where the entire compressed data stream is available at once.

In modern enterprise systems, data is transferred over many client/server connections (e.g. TCP connections) and the number of open connections can be substantially larger than the number of available decompression engines. In addition, connections are inherently packet oriented (TCP) and packets for different connections will arrive interspersed.

Moreover, it is increasingly common for network traffic to include compressed data. For example in compressed HTTP, all data is compressed and it is expected that up to 30% of network traffic can fall into this class.

In order to apply decompression hardware, all packets for a compressed file or message must be received and presented at once to the engine. For modern enterprise applications, there may be thousands of open connections that might carry compressed data to the servers. For packet inspection systems, like intrusion prevention systems, the number of open connections routed through the packet inspection system can be in the order of millions. The requirement to have the entire compressed data stream available can hence create significant memory pressure on the system and could therefore be exploited in service attacks. Alternatively, a decompression engine can be dedicated to a particular stream from the first to the last packet of a compressed message and thus packets could be decompressed one after the other. However, due to network traffic delays, packets belonging to a compressed message might arrive in a sequence of bursts, as determined by the network protocol (e.g. TCP/IP), and incoming packets of a single data stream may arrive over the course of several seconds or longer. Hence the number of concurrent connections that can be handled at a time is limited to the number of decompression engines. In addition, this could be exploited by attacks by not sending all packets.

In systems such as intrusion prevention systems, decompressed content must be inspected on a per packet level in order to determine intrusions as early as possible and either reject or forward the packet based on that analysis. In such a scenario, and using conventional technology, a single decompression engine must be dedicated to a single compressed data stream. The only other currently available option is to perform the decompression entirely in software.

SUMMARY

A method for decompressing multiple data streams includes receiving a packet of data of a compressed data stream, directing the received packet to a selected one of a plurality of decompression functional units within a hardware-based decompression accelerator unit, obtaining decompression state information pertaining to the compressed data stream, and decompressing the received packet using the obtained decompression state information.

The obtained decompression state information may reside as context information within a memory location local to the decompression accelerator. The obtained decompression state information may be copied to the memory location local to the decompression accelerator prior to decompressing the received packet. The obtained decompression state information may be copied to the memory location local to the decompression accelerator from a main memory of a host device connected to the decompression accelerator. The decompression state information may be copies from the main memory to the local memory via one or more intermediate layers. The memory location local to the decompression accelerator may be limited in size and decompression state information may be managed between the one or more intermediate layers and the local memory in accordance with a replacement policy.

After the received packet has been decompressed, the decompression state information may be updated. The received packet may be a first packet of a first data stream and one or more additional packets of one or more additional data streams may also be received and directed to available decompression functional units for decompression. Each decompression accelerator unit may decompress a different packet at the same time.

When a particular packet of a particular data stream is being decompressed within a particular decompression functional unit, the decompression state information pertaining to the particular data stream may be marked unavailable so that other decompression functional units are prevented from decompressing packets of the particular data stream while the particular packet is being decompressed by the particular decompression functional unit.

A hardware-based decompression accelerator system includes a command queue for storing one or more decompression request commands for decompressing one or more corresponding compressed packets of one or more corresponding data streams, a decompression control unit for receiving one or more decompression request commands from a host device and transferring them to the command queue, a load/store engine for obtaining decompression state information pertaining to the compressed data streams and moving the decompression state information to a memory location local to the decompression accelerator system, and one or more decompression functional units for receiving the decompression request commands from the command queue and for reading the decompression state information from the local memory and decompressing packets of compressed data in accordance with the received decompression request commands and using the read decompression state information, and updating the decompression state information after decompression has been performed.

The obtained decompression state information may reside as context information within the local memory. The load/store engine may copy the obtained decompression state information to the local memory before decompression is performed by the decompression functional units.

The accelerator may additionally include one or more intermediate layers between the main memory of the host device and the local memory for storing the decompression state information. The local memory may be limited in size and decompression state information may be managed between the one or more intermediate layers and the local memory in accordance with a replacement policy.

A computer system includes a processor and a program storage device readable by the computer system, embodying a program of instructions executable by the processor to perform method steps for decompressing multiple data streams. The method includes receiving a packet of data of a compressed data stream, directing the received packet to a selected one of a plurality of decompression functional units within a hardware-based decompression accelerator unit, obtaining decompression state information pertaining to the compressed data stream, and decompressing the received packet using the obtained decompression state information.

The obtained decompression state information may reside as context information within a memory location local to the decompression accelerator. The obtained decompression state information may be copied to the memory location local to the decompression accelerator from a main memory of a host device connected to the decompression accelerator and the decompression state information may be copied from the main memory to the local memory via one or more intermediate layers.

The memory location local to the decompression accelerator may be limited in size and decompression state information may be managed between the one or more intermediate layers and the local memory in accordance with a replacement policy. After the received packet has been decompressed, the decompression state information may be updated. The received packet may be a first packet of a first data stream and one or more additional packets of one or more additional data streams may also be received and directed to available decompression functional units for decompression. Each decompression accelerator unit may decompress a different packet at the same time.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
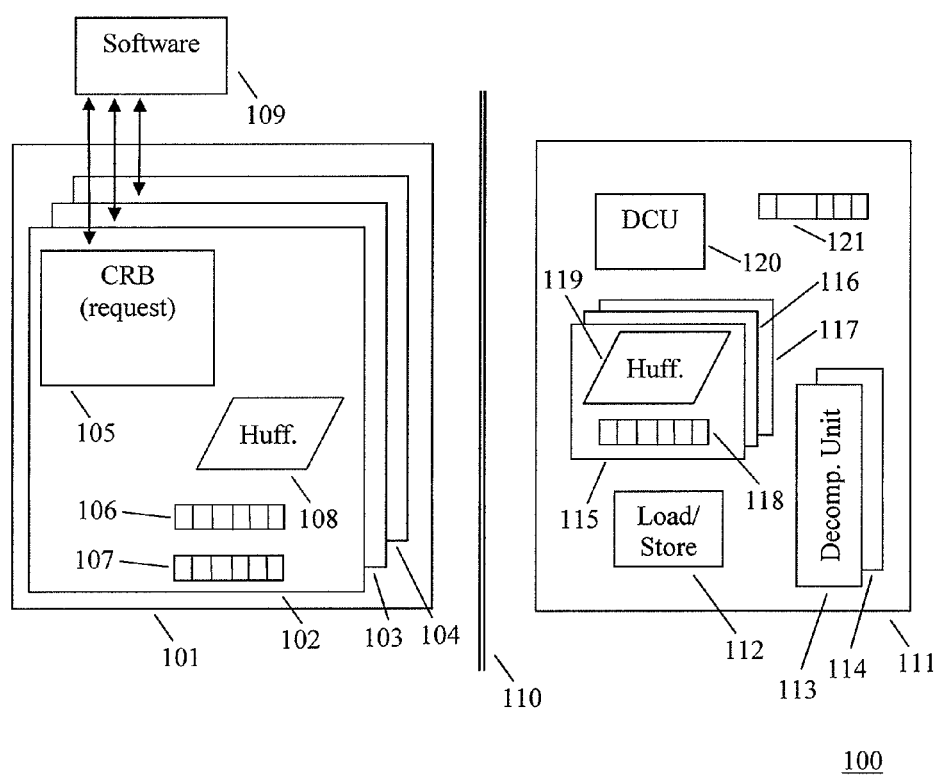
FIG. 1 is a block diagram illustrating a system for decompressing multiple data streams according to an exemplary embodiment of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Given the large number of connections that might require simultaneous decompression, for example 1 million connections or more, coupled with the necessity to decompress data streams on a per packet base, a hardware-based decompression engine should be able to efficiently switch between many decompression streams. Hence exemplary embodiments of the present invention provide a method and apparatus that maintains per stream decompression state and have the ability to store/retrieve the decompression state efficiently when a new packet for a data stream arrives. Accordingly, each decompression engine can efficiently switch between decompressing different streams by utilizing the stored states and retrieval mechanisms.

Exemplary embodiments of the present invention provide inline high speed decompression of data streams. These characteristics may be provided for a large number of concurrent data streams. The decompression states may be maintained such that limited hardware resources may be efficiently utilized and shared without significantly increasing latencies and memory bandwidth in the system. Exemplary embodiments of the present invention provide for the efficient switching between multiple decompression requests.

Exemplary embodiments of the present invention provide a data processing system having a decompression apparatus that decompresses multiple concurrent streams without requiring apriori availability of the entire data streams. Accordingly, decompression may be performed as the data stream arrives and may be temporarily halted while waiting for additional data to arrive. During this period, the hardware-based decompression engine may work on decompression of another data stream. The apparatus maintains the decompression state of each data stream and provides for means to store to and retrieve from storage said decompression state. Hence the apparatus can handle many concurrent data streams by switching between the states and multiplexing the concurrent data streams over a finite number of decompression engines. Accordingly the data streams can be presented in chunks and over a time, which is particularly useful when the data streams are received in a packet oriented environments such as networking requiring decompression. When a stream chunk is presented, the apparatus retrieves the previous state of the associated data stream and continues decompression from the previous state until the chunk data is consumed. The state includes the limited decompression history maintained in a history window and optional token lookup tables (e.g. Huffman Tables). In order to reduce resource requirements for each stream, the apparatus maintains a compact history and state and relinquishes resource based on concurrent stream requirements.

The apparatus may include a unit that tracks references inside the history window and utilizes this information to compact the stream state. The apparatus may further include a unit that loads, stores and maintains a compact stream state. The apparatus may further include a unit that schedules multiple concurrent decompression requests based on packets and state information.

Exemplary embodiments of the present invention may be described herein with reference to the Deflate algorithm described above, however, it is to be understood that this invention may be easily applied to the hardware-based engine decompression of multiple data streams without regard to the particular form of decompression applied or the particular decompression algorithm used.

As described herein, it may be assumed that a compressed data stream S(i) includes a sequence of tokens T(i,j) and an optional encoding table HT(i) (e.g. Huffman table) through which tokens T(i,j) are decoded into generic text. It may be further assumed that S(i) can be presented to the decompression engine in a sequence of data chunks or packets P(i,k). The decompression algorithm works without regard to the size of the packets as long as the decompression state ST(i, k+1) reached after P(i,k) is processed is available when P(i, k+1) is presented at a later point.

The state ST(i) of a compressed data stream includes parameters describing the input buffer IB(i,k) and output buffer OB(i,k) of the currently operated upon packet P(i,k). The state includes an offset into the input buffer at which the next compressed byte needs to be consumed and an offset into the output buffer at which the next decompressed byte needs to be written. The state further includes a history window that can either overlap the output buffer or can be a separate buffer.

The data stream state may further include optional pointers to auxiliary tables such as the Huffman table. When a packet arrives for a compressed stream S(i) that was not previously encountered, storage is allocated in main memory to hold the state ST(i) for the compressed stream S(i). The new state S(i) may then be initiated. The software then constructs a coprocessor request block (CRB) which includes the input buffer address, the input buffer length, the output buffer address, the maximum output buffer length and a pointer to the state ST(i).

Having described the general operation and data structures, the handling of a request CRB is now described. FIG. 1 is a block diagram illustrating a system for decompressing multiple data streams according to an exemplary embodiment of the present invention. The request CRB 105 is submitted to the accelerator 111 through well established mechanisms such as memory mapped I/O. The details of memory mapped I/O are understood in the art. It may be assumed that there is a queue of outstanding CRBs (CRB-Q) 121 that are accepted and handled by the decompression control unit (DCU) 120.

According to an exemplary embodiment of the present invention, the data structure, including Huffman tables 119 and history windows 118, may be maintained in memory. The CRB is submitted to the decompression engine and stored in a request queue. The decompression engine retrieves the CRB 105 and starts fetching the input, Huffman table, and history data. The decompression engine then begins writing the output buffer 107 according to the decompression algorithm used. Thus, the decompression engine, when accessing the data stream state, will retrieve the state from a main memory and store modifications to the state back into main memory.

Accessing the states stored in main memory may be slowed as a result of the access latency of the memory. In modern systems, this latency may be measured in hundreds of cycles. However, exemplary embodiments of the present invention may store frequently accessed state in a decompression engine register or limited local memory. Accordingly, the latency associated with the memory access may be avoided, to the greatest extent possible, by queuing the memory access requests until the memory has been accessed, at which point the request is re-queued to the decompression engine. In the meantime the decompression engine can dequeue another pending request (new or those that resolved their memory accesses) and operate on it.

As a result, multiple concurrent compressed data streams can be decompressed concurrently and the number of streams that can be concurrently decompressed is limited only by the number of states that can be maintained in main storage.

For reasons described above, accesses to main memory to retrieve and store history, write output buffer and access the Huffman Table can introduce significant latency. Data reuse, for example, reuse of the history and the Huffman table is widely expected in decompression and can be exploited. Accordingly, a cache of the state ST(i) may be kept as close to the engines as feasible to reduce memory bus traffic and to reduce state access time. Moreover, network packets often arrive in bursts and therefore a reuse of a cached state is likely when processing data in bursts.

By caching the most used data stream states, the adverse effects of main memory latency may be minimized. Hence a limited number of local states are maintained close to the decompression apparatus and act as a cache for active and/or recently accessed states ST(i)'s. A particular representation of a decompression state presented in a state cache may be referred to herein as a "context." Similarly, the term "context" may also be used to describe the state cache location itself. A hierarchy of contexts may be used to store states, where each layer closer to the decompression unit provides better access latency at the cost of less storage. While any number of context hierarchies may be used, a typical implementation may consists of three hierarchical layers: a main memory, an intermediate layer and a close layer.

At any level y of the context hierarchy a context C(x,y) can be in the following states: idle, busy, or available. Idle implies that the context is not populated with any state. Busy implies that the context is currently used in an acceleration request. Available implies that the context is not currently involved in an acceleration request, however it caches the state of a stream that potentially backs state in context further up the context hierarchy, for example, closer to the decompression unit.

When the decompression control unit (DCU) 120 retrieves a request from its ready queue RQ it identifies whether the associated state ST(i) is bound to any context C(x) at the context layer. The main memory may be identified as context layer 0. If bound, the context status of C(x) is set to busy and the request is submitted to the next hierarchy where a run queue is also maintained. The function, as described so far and further described below, may be performed recursively at the next higher level. Accordingly, if no context is bound to the state, a context needs to be determined. To do so, a list of idle contexts is maintained at each context layer. If the idle list is not empty a context is taken from the list and the context is pre-populated. If no idle context is available, the list of available contexts is examined and based on a reuse policy, a context is selected that will be utilized. An example of a suitable reuse policy may be Least Recently Used (LRU). Once an available context is identified, its state is synchronized with the lower hierarchy. The context is marked as busy. Having obtained a context that was already bound or is now bound to the state ST(i) the context is now populated with the relevant state information of ST(i) such as buffer pointers, offsets etc., the optional Huffman Decode Table and the high density reference region of the history by loading it from the previous context layer. Once populated, the request is submitted to the next layer.

In order for a context to be non-idle at layer y it must be bound to a context at layer y–1 that is non-idle. Upon completion of a request, the context C(x,y) associated with state ST(i) is marked as available and completion is propagated down the hierarchy, marking the associated context as available for all y>0. Any changes in the state ST(i) at layer y that is to be seen by the software layer need to be reflected in layer y–1 and so forth to maintain consistency. In particular the output buffer is reflected all the way to layer–0. Any other state can be flushed at the time the context is revoked through the previously described mechanism, when a context is retrieved from the available list. However, states may also be pushed back using a more proactive approach.

Once a request at layer y is completed, a check is performed whether there are outstanding requests for other ST(i) at which point this algorithm repeats by grabbing the just finished and now available context and forcing a context switch at this level.

Once the context has been written back to its previous context layer, the context can be discarded and populated with another state if there are outstanding requests pending.

Such context switch may force any state that has not been written back to layer–(y–1) to occur. Once the decompression engine signals that the end of a stream has been reached, the context is written back and added to the free list and such completion is triggered throughout all the hierarchies forcing a release of the context into idle mode. At the same time, when an idle context is established the DCU attempts to schedule outstanding requests at its level.

Data in recent history may be more frequently referenced than older data in the history buffer. As a result, the history may be partitioned into two parts: a recent history region and a distant history region. The history regions may shift as the history window of the history progresses.

The history buffer may be managed at a context layer y (y>0). The history is fully available in main memory, at context layer=0. According to an exemplary embodiment of the present invention, there may be sufficient storage available for each context to hold the entire history buffer and the data stream state. Accordingly the number of contexts that can be maintained at each context layer is determined by the amount of storage associated with that layer. Before a context is submitted to the next higher layer, it is populated with the state from the previous layer utilizing the Load/Store Unit (LSU(y)). The Distant History as defined at layer y is not loaded at this time. The context keeps track of which context history block is loaded and which context history blocks are not loaded. An attempt access to a context history block that is not yet present in storage at layer-y triggers the LSU(y) to request the context history block from layer (y–1) or if y is equal 0 from main memory. Accordingly, on demand loading may lead to recursive context history loading until the context is found in a cache layer or has been loaded from main memory. As output buffer updates are generated at layer (y+1), the updates are reflected back to main memory and in the history buffer at layer y and below. This can be done proactively or at a time when the history window would move outside a block that is not yet written back or at the time when the request has completed.

According to an exemplary embodiment of the present invention, additional contexts may be maintained in the same amount of available storage at layer-y by sharing all storage at layer y among the distant history portions of the contexts at layer y and managing the storage layers according to a replacement policy, for example LRU or LFU. Here each history buffer block maintains a reference to a storage block as well as a marker that a history buffer block is not present in local storage. When a history buffer miss is encountered, for example, an access encountered the non-present status, a storage block is allocated from a free list, entered into a LRU list and then populated through the LSU from the previous context layer.

If no storage block is available, a block is allocated from the LRU, the history buffer block currently owning this block is marked as non-present, the storage block is populated through the LSU and is then assigned to the history buffer block that encountered the miss.

The size of the recent history region may either be fixed, for example at 4 Kbytes, or can be determined based on the current state ST(i). This reduces the pre-population time of the state context and enables an earlier start of the decompression.

FIG. 1 is a block diagram illustrating a system for decompressing multiple data streams according to an exemplary embodiment of the present invention. The decompression accelerator is a hardware device that may be used to decompress compressed data streams. The decompression accelerator may be used, for example, by a packet analyzer to analyze packets of compressed data streams. Before the packets can be analyzed, however, they must be decompressed. By offloading decompression to the hardware-based decompression accelerator, the packet analyzer can better accommodate decompression of an extremely high number of compressed data streams.

The decompression accelerator may be used for a wide variety of purposes and is not limited to use in connection with a packet analyzer, however, the disclosure uses the packet analyzer as an example of a system that may utilize the decompression accelerator. It is to be understood that the decompression accelerator may be used with any form of digital device requiring fast decompression of a plurality of data streams.

The packet analyzer 100 may include a state-specific section of main memory 101 and a decompression accelerator 111. The decompression accelerator 111 may communicate with the state-specific section of main memory 101 across an internal data bus 110. A complete set of states may be stored in the state-specific section of main memory 101. In this figure, three states 102, 103 and 104 are shown, however it should be understood that there may be any number of stored states, for example, there may be millions of states stored in the state-specific section of main memory 101.

Each state 102, 103, 104 may include all of the information necessary for decompressing a particular data stream. Each unique data stream handled by the decompression accelerator 111 may have a corresponding state in the state-specific section of main memory 101. The information of each state may include a coprocessor request block (CRB) request 105 for providing the decompression accelerator 111 with necessary instructions to decompress the corresponding data stream. The CRB request 105 may include a coprocessor control block, a control parameter block, a control status block pointer, an input buffer pointer and an output buffer pointer. The state-specific section of main memory 101 may also include a Huffman table 108, where required and/or any other required decompression tables as dictated by the decompression algorithm being used. The main memory 101 may also include an input buffer 106 and an output buffer 107.

The packet analyzer 100 software 109 may provide the CRB request information 105 necessary to perform decompression.

The decompression accelerator 111 may include a load/store engine 112 that can receive the CRB request information 105 and the Huffman table 108 from the state-specific section of main memory 101 and establish a set of decompression contexts 115, 116 and 117 that are stored locally. The load/store engine 112 thus implements the logic associated with calling the necessary information from the main memory and providing it to one or more decompression functional units 113 and 114 as needed. As described above, the load/store engine 112 may have decompression contexts 115, 116 and 117 for storing states in memory local to the decompression accelerator 111. However, there may be multiple layers of local memory dedicated to this task. The various layers of memory may have different sizes and speeds such that the more frequently accessed contexts may be stored in the faster memory while the less used contexts may be stored in the slower but more abundant memory. The load/store engine 112 may handle the shuffling of contexts between the various layers of memory according to a predetermined replacement policy.

Each decompression context may include a copy of the Huffman table 119 and a history window 118 that includes certain information from previous packets that may be referenced during decompression.

The decompression accelerator 111 may also include a decompression control unit 120 that can accept active decompression requests and provide it to a CRB Run Queue 121. Thus the CRB Run Queue 121 may maintain a list of CRB requests to process as decompression functional units become available.

The decompression accelerator 111 may include multiple decompression functional units 113 and 114. Two units are shown by way of example, but the decompression accelerator 111 may include many more multiple decompression functional units. As described above, when a decompression functional unit becomes available, for example, by either completing decompression of an entire data stream or because there is a temporary disruption in reception of packets pertaining to a particular data stream, the decompression functional units 113 and 114 may receive additional requests from the CRB Run Queue 121.

In the case where there is a temporary disruption in reception of packets pertaining to a particular data stream, the decompression functional unit may save the decompression state information for the active data stream and then load the state information for the next stream in accordance with the next CRB request.

Figure 2:
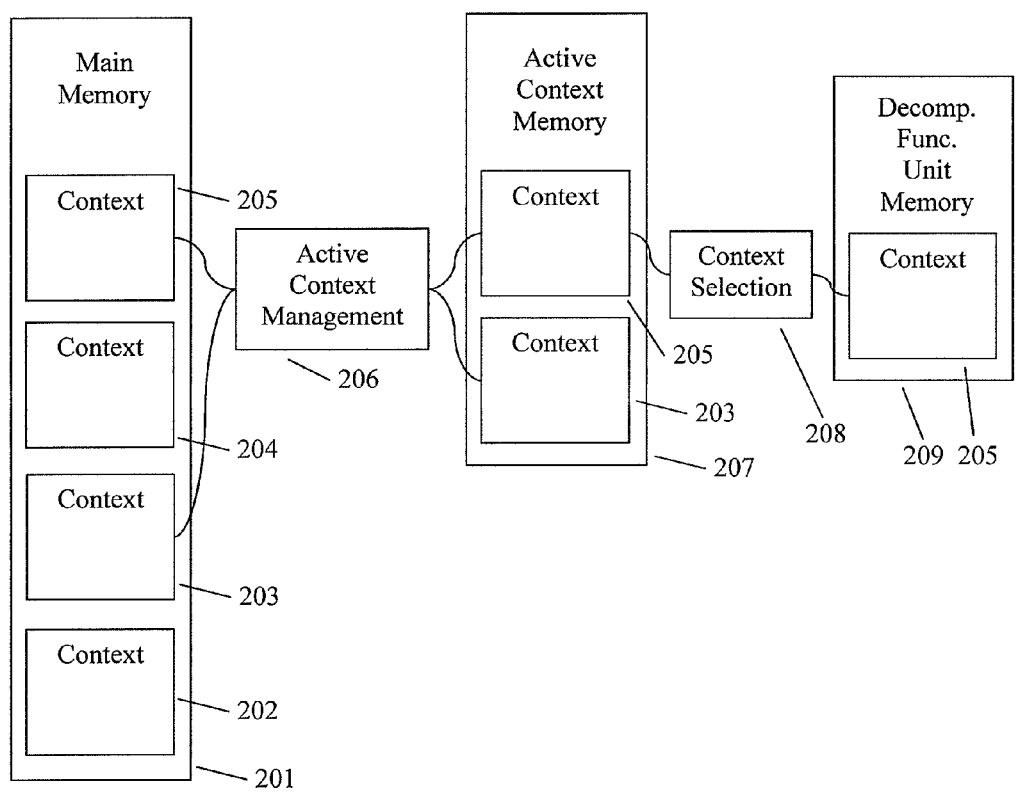
FIG. 2 is a block diagram illustrating a memory hierarchy for storing context information according to an exemplary embodiment of the present invention.

As discussed above, there may be multiple functional layers in which state information may be stored as contexts. FIG. 2 is a block diagram illustrating a memory hierarchy for storing context information according to an exemplary embodiment of the present invention. As discussed above, all context information 202-205 may be stored in the main memory 201. However, because the main memory 201 is accessed across the bus, and because the decompression accelerator may switch between data streams very quickly, more frequently used contexts may be copied to a memory local to the decompression accelerator. As shown, an active context management unit may select several frequently used contexts and copy them to a memory location local to the decompression accelerator, for example, an active context memory location 207. Here, several active contexts may be stored. Similarly, there may be another layer of memory that may be closer and/or faster to the decompression functional unit. This memory may be a decompression functional unit memory 209 and may be located within each decompression functional unit. A context selection unit 208 may have responsibility for copying a context from the active context memory 207 to the decompression functional unit memory 209.

Figure 3:
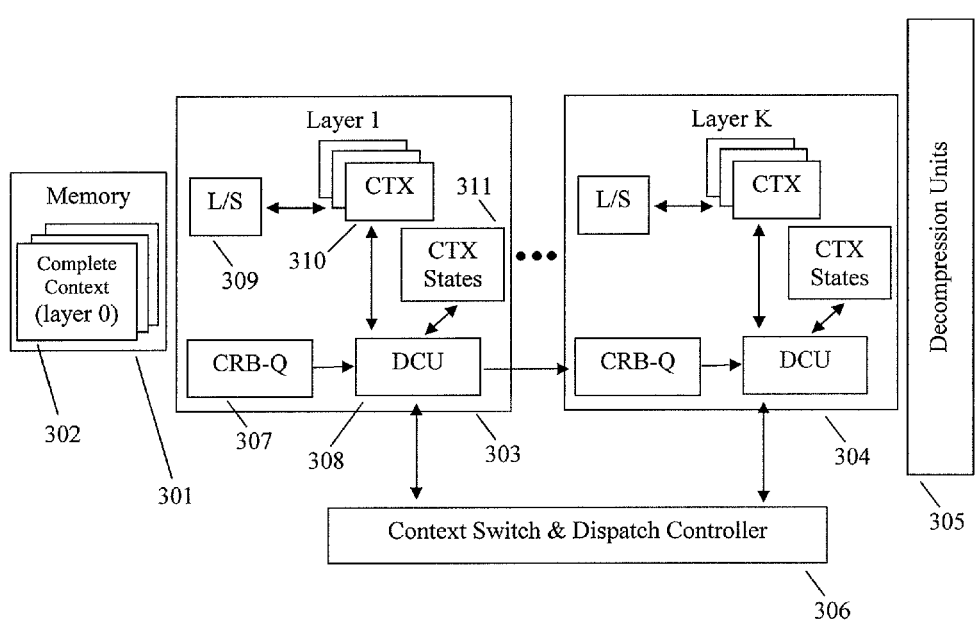
FIG. 3 is a block diagram illustrating multi-layer context management according to an exemplary embodiment of the present invention

FIG. 3 is a block diagram illustrating multi-layer context management according to an exemplary embodiment of the present invention. As described above, there is a main memory 301 within which is a complete set of contexts 302. The main memory may be considered a level 0 functional layer. The main memory 301 connects across a bus to a level 1 functional layer ("layer 1") 303. The layer 1 303 may include a CRB queue 307 for receiving requests and processing those requests in order. A decompression control unit 308 reads the requests from the CRB queue 307 and reads the contexts 310 stored in that layer. The contexts may be copied to that layer by a load/store unit 309. The decompression control unit 308 may also read the present context state 311. The context state may either be set to idle, available or busy. In this way, the decompression control unit 308 can learn the state of each decompression unit 305 to determine if it is idle, available or busy. An idle unit is a unit that awaits additional packets, an available unit is a unit that is not processing a data stream and a busy unit is a unit that is currently processing a data stream. Thus CRB requests may be passed along from layer to layer and then to the CRB run queue for the decompression accelerator. As each functional layer may include a DCU, the DCUs may be responsible for moving along the CRB requests. A context switch and dispatch controller 306 may be responsible for switching data streams for idle units so that a unit, when idle, can begin to decompress an available stream.

There may be multiple layers with similar configurations to the layer 1 layer. For example, there may be a layer 1, a layer 2, ... a layer K−1, and a layer K 304. As described above, each layer may be increasingly faster and/or closer to the decompression unit.

Figure 4:
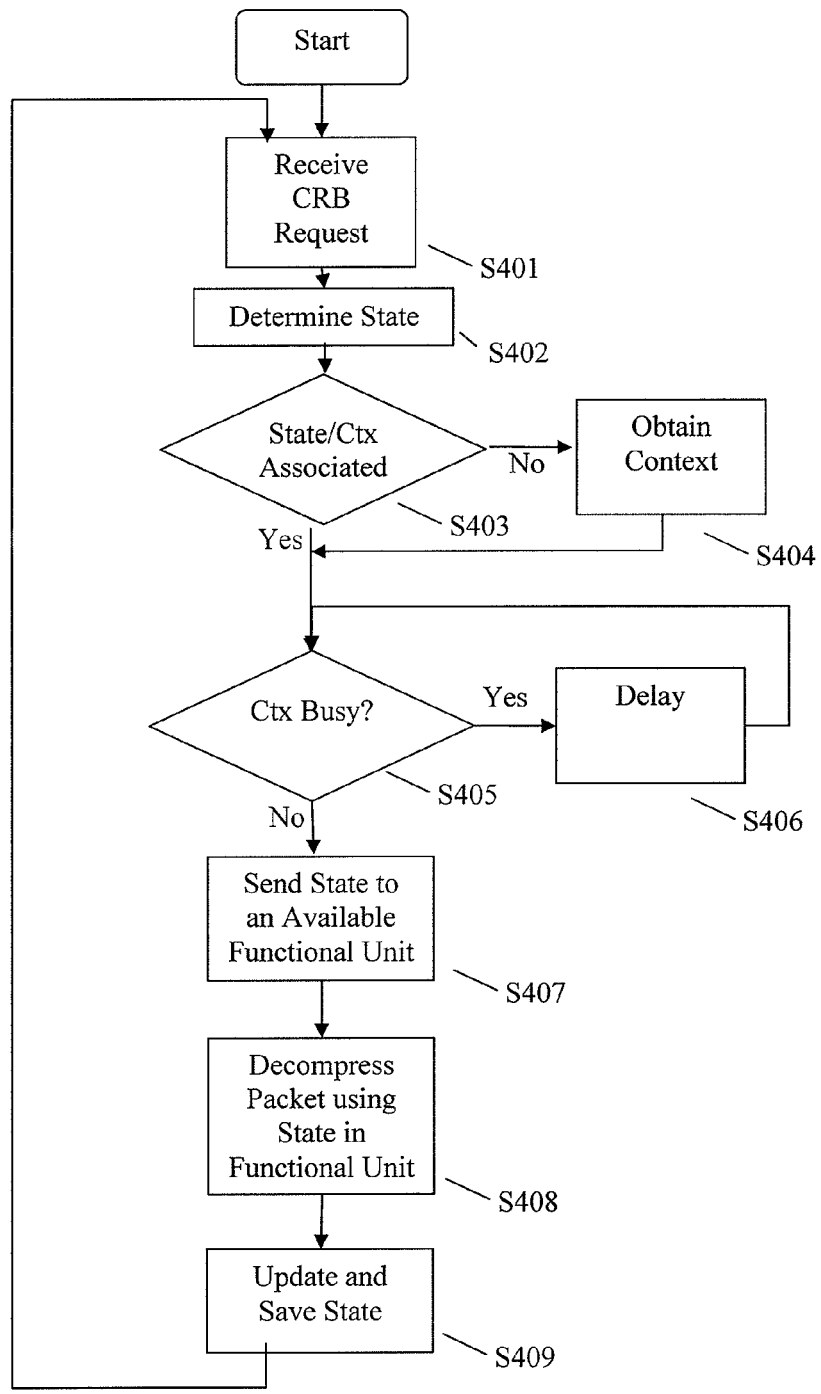
FIG. 4 is a flow chart illustrating a method for decompressing multiple data streams according to an exemplary embodiment of the present invention.

FIG. 4 is a flow chart illustrating a method for decompressing multiple data streams according to an exemplary embodiment of the present invention. First, CRB request is received by the accelerator (Step S401). Then, the state of the compressed data stream is determined from the parameters of the received CRB request (Step S402).

Next, it is determined whether the determined state is already associated with a context (Step S403). For example, it is determined whether the state is already stored locally to the accelerator. If it is not, (No, Step S403) then the state must be established as a local context (Step S404). This may be accomplished in a number of ways. For example, the state may be loaded from a lower level in accordance with a replacement policy. If needed, the state may be loaded up from the level 0 layer that is within main memory. If the CRB pertains to the processing of a first packet of a data stream and no state information has been created, the state information may be created.

Exemplary embodiments of the present invention may use multiple decompression functional units, and to prevent multiple decompression functional units from decompressing packets from the same data stream at the same time, a context may be marked "busy" while in use, for example, by another decompression functional unit. For this reason, prior to performing decompression of the packet, after it is ensured that the context is local to the accelerator, it is determined whether the context is busy (Step S405). If the context is in fact busy (Yes, Step S405) then a delay may occur (Step S406 until the context is no longer busy (No, Step S405). Once the context is no longer busy (No, Step S405) the CRB may be sent to an available functional unit of the decompression accelerator and that unit may read the state (Step S407). The functional unit may then use state information for the data stream from the context to decompress the packet (Step S408).

After the packet has been decompressed, the state information within the context may be updated and saved (Step S409). Updates may carry through all layers.

Accordingly, each packet may be decompressed by an available functional unit as each packet becomes available. If a packet from a first data stream is followed by a packet from a second data stream, the same functional unit may decompress both packets by loading the appropriate state before decompression and then saving the state after decompression. Thus it is not necessary that a single functional unit be limited to decompressing a single data stream.

Additionally, if there is a pause in packet reception for a particular data stream, the decompression functional unit need not remain idle until additional packets from that data stream are received, it can immediately begin decompressing the next packet regardless of which data stream it corresponds to. Such a pause may be for a fraction of a second but in that time, the context can be saved and the next packet may be processes.

Figure 5:
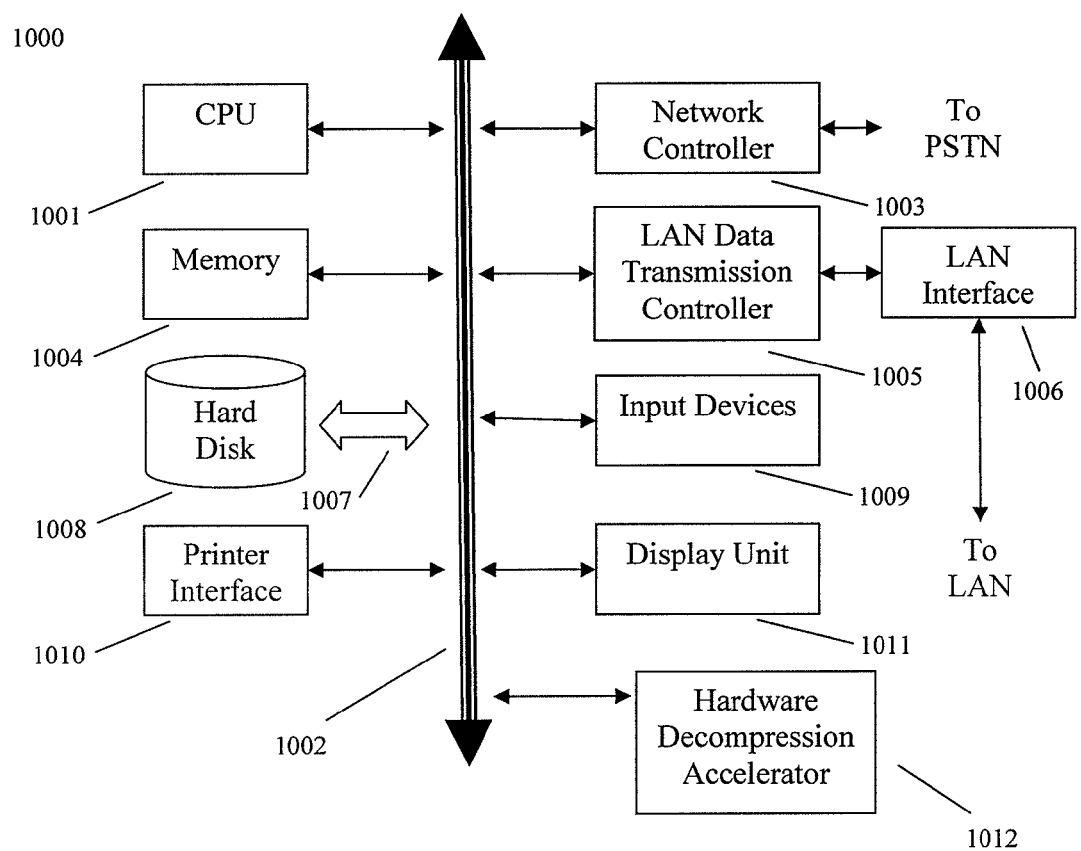
FIG. 5 shows an example of a computer system capable of implementing the method and apparatus according to embodiments of the present disclosure.

FIG. 5 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007. The computer system may additionally include a hardware decompression accelerator 1012 connected to the internal bus 1002. The hardware decompression accelerator 1012 may be as described above.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for decompressing multiple data streams, comprising:
  receiving a first packet of data of a first compressed data stream;
  directing the received first packet of the first compressed data stream to a selected one of a plurality of decompression functional units within a hardware-based decompression accelerator unit;
  obtaining decompression state information pertaining to the first compressed data stream;
  decompressing the received first packet of the first compressed data stream using the obtained decompression state information pertaining to the first compressed data stream within the selected decompression functional unit;
  receiving a packet of data of a second compressed data stream;
  directing the received packet of the second compressed data stream to the same selected decompression functional unit that the first compressed data stream was directed to;
  storing the decompression state information pertaining to the first compressed data stream;
  obtaining decompression state information pertaining to the second compressed data stream;
  decompressing the received packet of the second compressed data stream using the obtained decompression state information pertaining to the second compressed data stream within the selected decompression functional unit;
  receiving a second packet of data of the first compressed data stream;
  directing the received second packet of the second compressed data stream to the same selected decompression functional unit that the first and second data stream were directed to;
  storing the decompression state information pertaining to the second compressed data stream;
  obtaining the decompression state information pertaining to the first compressed data stream; and
  decompressing the received second packet of the first compressed data stream using the obtained decompression state information pertaining to the first compressed data stream within the selected decompression functional unit.

2. The method of claim 1, wherein the decompressing of the first compressed data stream is temporarily halted while waiting for the second data packet of the first compressed data stream.

3. The method of claim 1, wherein the obtained decompression state information pertaining to the first and second compressed data streams resides as context information within a memory location local to the decompression accelerator unit.

4. The method of claim 3, wherein the obtained decompression state information pertaining to the first and second compressed data streams is copied to the memory location local to the decompression accelerator unit prior to decompressing the received packet.

5. The method of claim 4, wherein the obtained decompression state information pertaining to the first and second compressed data streams is copied to the memory location local to the decompression accelerator unit from a main memory of a host device connected to the decompression accelerator unit.

6. The method of claim 5, wherein the decompression state information pertaining to the first and second compressed data streams is copied from the main memory to the local memory via one or more intermediate layers.

7. The method of claim 6, wherein the memory location local to the decompression accelerator unit is limited in size and decompression state information pertaining to the first and second compressed data streams is managed between the one or more intermediate layers and the local memory in accordance with a replacement policy.

8. The method of claim 1, wherein after the received packet has been decompressed, the respective decompression state information is updated.

9. A computer system comprising:
a processor; and
a program storage device readable by the computer system, tangibly embodying a program of instructions executable by the processor to perform a method of decompressing multiple data streams, the method comprising:
receiving a first packet of data of a first compressed data stream;
directing the received first packet of the first compressed data stream to a selected one of a plurality of decompression functional units within a hardware-based decompression accelerator unit;
obtaining decompression state information pertaining to the first compressed data stream;
decompressing the received first packet of the first compressed data stream using the obtained decompression state information pertaining to the first compressed data stream within the selected decompression functional unit;
receiving a packet of data of a second compressed data stream;
directing the received packet of the second compressed data stream to the same selected decompression functional unit that the first compressed data stream was directed to;
storing the decompression state information pertaining to the first compressed data stream;
obtaining decompression state information pertaining to the second compressed data stream;
decompressing the received packet of the second compressed data stream using the obtained decompression state information pertaining to the second compressed data stream within the selected decompression functional unit;
receiving a second packet of data of the first compressed data stream;
directing the received second packet of the second compressed data stream to the same selected decompression functional unit that the first and second data stream were directed to;
storing the decompression state information pertaining to the second compressed data stream;
obtaining the decompression state information pertaining to the first compressed data stream; and
decompressing the received second packet of the first compressed data stream using the obtained decompression state information pertaining to the first compressed data stream within the selected decompression functional unit.

10. The computer system of claim 9, wherein the decompressing of the first compressed data stream is temporarily halted while waiting for the second data packet of the first compressed data stream.

11. The computer system of claim 10, wherein the obtained decompression state information pertaining to the first and second compressed data streams resides as context information within a memory location local to the decompression accelerator unit.

12. The computer system of claim 11, wherein the obtained decompression state information pertaining to the first and second compressed data streams is copied to the memory location local to the decompression accelerator unit prior to decompressing the received packet.

13. The computer system of claim 12, wherein the obtained decompression state information pertaining to the first and second compressed data streams is copied to the memory location local to the decompression accelerator unit from a main memory of a host device connected to the decompression accelerator unit.

14. The computer system of claim 13, wherein the decompression state information pertaining to the first and second compressed data streams is copied from the main memory to the local memory via one or more intermediate layers.

15. The computer system of claim 14, wherein the memory location local to the decompression accelerator unit is limited in size and decompression state information pertaining to the first and second compressed data streams is managed between the one or more intermediate layers and the local memory in accordance with a replacement policy.

16. The computer system of claim 9, wherein after the received packet has been decompressed, the respective decompression state information is updated.

* * * * *